United States Patent [19]

Smith

[11] Patent Number: 4,862,770
[45] Date of Patent: Sep. 5, 1989

[54] TWO-SPEED ALTERNATOR DRIVE

[75] Inventor: Franklin R. Smith, Slaterville Springs, N.J.

[73] Assignee: Borg-Warner Automotive, Inc., Troy, Mich.

[21] Appl. No.: 72,485

[22] Filed: Jul. 13, 1987

[51] Int. Cl.⁴ ............................................... F16H 3/44
[52] U.S. Cl. .......................................... 74/789; 74/801
[58] Field of Search ...................... 74/789, 801, 750 R, 74/792; 192/48.92, 46, 48.9

[56] References Cited

U.S. PATENT DOCUMENTS

| | | | |
|---|---|---|---|
| 1,274,056 | 7/1918 | Jones | 74/789 |
| 1,297,439 | 3/1919 | Bugher | 74/789 |
| 1,406,119 | 2/1922 | Watanabe | 74/789 |
| 1,649,050 | 11/1927 | Winch | 74/789 |
| 1,950,694 | 3/1934 | Parkinson | 192/48.92 |
| 2,477,024 | 7/1949 | Webster | 74/789 |
| 2,690,086 | 9/1954 | Cook et al. | 74/792 X |
| 2,901,073 | 8/1959 | Bomhard et al. | 192/48.92 |
| 3,037,600 | 6/1962 | Heckethorn | 192/45.1 |
| 3,228,261 | 1/1966 | Puls et al. | 74/789 X |
| 3,374,692 | 3/1968 | Kitch et al. | 74/792 |
| 3,747,731 | 7/1973 | Smirl | 192/104 R |
| 3,954,028 | 5/1976 | Windish | 74/789 |
| 4,020,711 | 5/1977 | Woollard | 74/230.17 E |
| 4,080,843 | 3/1978 | Underwood | 74/336 R |
| 4,147,242 | 4/1979 | Fujioka | 74/688 |
| 4,265,135 | 5/1981 | Smirl | 74/336 B |
| 4,412,460 | 11/1983 | Barthelemy | 74/752 E |
| 4,502,345 | 3/1985 | Butterfield | 74/336 B |
| 4,667,537 | 5/1987 | Sivalingham | 74/752 E |
| 4,679,456 | 7/1987 | Kaneyuki | 74/752 D |
| 4,776,238 | 10/1988 | Premiski et al. | 74/789 |

Primary Examiner—Leslie A. Braun
Assistant Examiner—William Gehris
Attorney, Agent, or Firm—Robert L. Zieg; James J. Jennings; James A. Geppert

[57] ABSTRACT

A two-speed gear box adapted to be mounted on the face of an automobile accessory, such as an automotive alternator to increase the speed of the alternator on demand. The gear box includes input and output shafts operatively connected by a planetary gear arrangement having first and second sun gears and a planet carrier for pairs of first and second planet gears, a band brake releasably applied to the planet carrier and a one-way clutch between the shafts to allow faster rotation of the output shaft relative to the input shaft. The planetary arrangement does not have a ring gear engaging the planet gears.

14 Claims, 3 Drawing Sheets

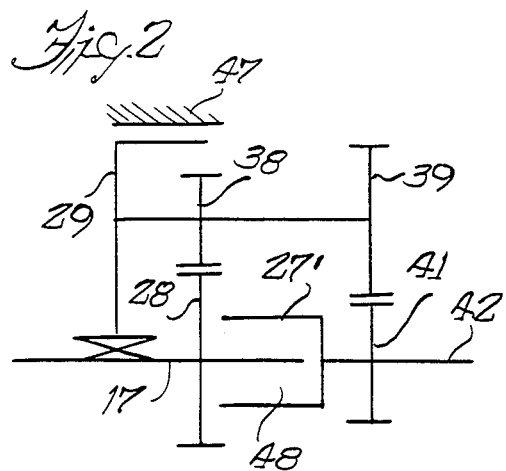
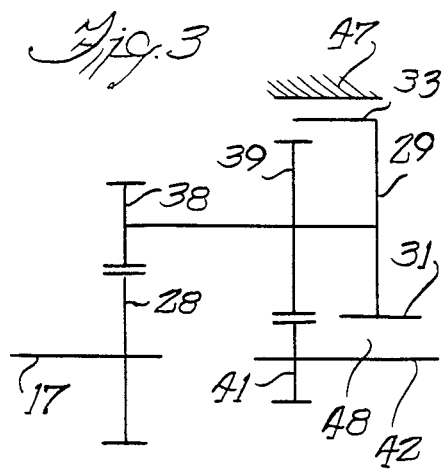
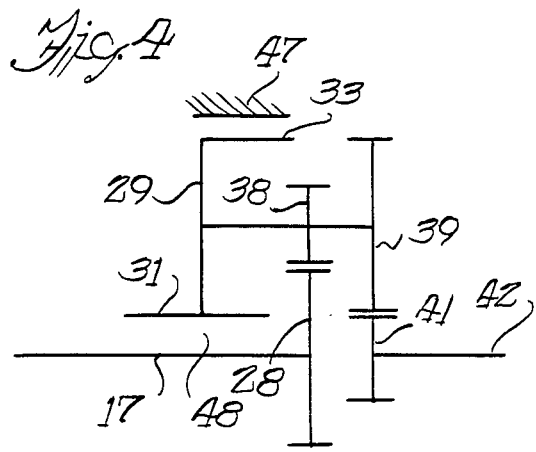
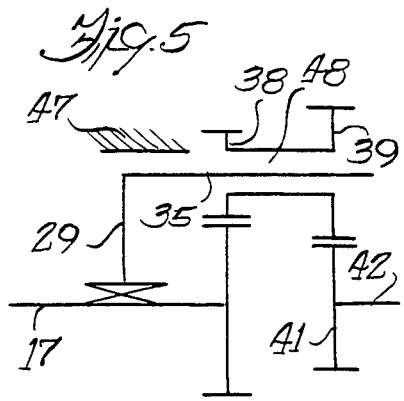
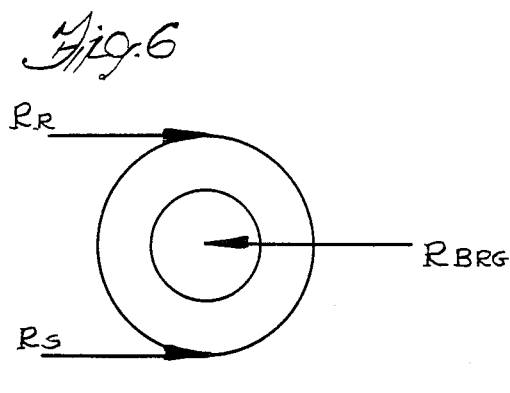
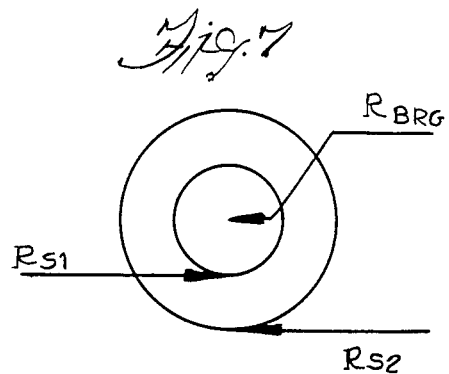

TWO-SPEED ALTERNATOR DRIVE

BACKGROUND OF THE INVENTION

In the design of automobile alternators, several factors must be considered. In general, there must be a compromise between acceptable speeds for the alternator and the desired output. Tests show that the alternator output current drops drastically when the alternator speed falls below 3,000 rpm. On the other hand, the alternator output current rises only slightly when the alternator speed exceeds 10,000 rpm. Under ideal conditions, the alternator would operate at a continual speed change dependent on the required alternator output. Present alternator operation is accomplished by standard fixed belt pulley ratios from the crankshaft of the engine to the alternator input pulley, thus alternator speed changes with engine speed. This ratio is determined by the required minimum alternator output current and the minimum engine idle speed. While this method may work well at lower engine speeds, higher engine speeds cause excessive alternator speeds; consequently, alternator design becomes very difficult. Predicted future trends show that alternator loads will increase dramatically and, in some instances, this is already a problem.

Possible solutions to this problem are:

(1) Increase the pulley ratio. Although this would work well for lower speeds, high engine speeds would cause alternator overspeed.

(2) Increase the engine idle speed. This would adversely affect the vehicle's drivability and fuel economy.

(3) Add another alternator. This solution would be costly, would have a negative impact on the engine's performance, and would be very difficult to package.

(4) Develop a multi-speed alternator drive unit. Constant speed drives tend to be bulky and expensive, however, a two-speed drive unit could be developed that would be cost effective and easily packaged.
The present invention relates to a two-speed alternator drive unit to address this problem.

SUMMARY OF THE INVENTION

The present invention relates to a two-speed gear box adapted to be mounted on the face of an automotive alternator to increase the speed of the alternator on demand. The alternator drive uses a compact gear train and clutch assembly mounted onto the face of the alternator to achieve the dual-speed operation. The engaged mode, for example a two-to-one internal gear ratio, is utilized to achieve the required alternator speed at low engine speeds. The device then shifts to the disengaged mode at a predetermined engine speed, which results in a direct drive of a one-to-one internal ratio; thus preventing excessive alternator speeds at high engine speeds. The end result is a drive that provides the automobile with the required output current at low engine speeds, but does not cause alternator over-speed at high engine speeds.

The present invention also relates to a two-speed alternator drive utilizing a compact gear train and clutch assembly wherein the operation of the gear train only in engaged mode assures minimal mechanical losses. A vacuum or other suitably actuated clutch assembly adds negligible electrical and no mechanical loads to the engine, and engine drag due to alternator inertia may be decreased by using a smaller alternator with this device. Also low bearing and gear speeds of the device provide for quiet, durable operation. Control of the alternator drive could be provided by the vehicle engine control module with a user-tailored control strategy.

The present invention further relates to a two-speed gear box that controls the speed of an alternator or other accessory that is attached to it. This device includes an input shaft driven from the engine crankshaft, two sun gears, multiple sets of planet gears mounted on a common planet carrier, a brake band actuated by vacuum or other suitable means, a one-way clutch, and numerous support bearings. The planetary gear system does not have an outer ring gear, however, the common planet carrier has an outer cylindrical surface adapted to be engaged by the brake band to alter the speed of the alternator. When the brake band is disengaged, the one-way clutch drives the output shaft at the same speed as the input shaft; the one-way clutch allowing the output shaft to overspeed the input shaft when the brake band engages the planet carrier.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIGS. 2 through 5 are schematic showings of other possible locations of the one-way clutch and brake band to maintain the original function of the invention.

FIGS. 6 and 7 disclose schematic showings of reaction loads on the bearings for the planetary gears for a planetary arrangement with and without a ring gear.

DESCRIPTION OF THE PREFERRED EMBODIMENTS

Figure 1:
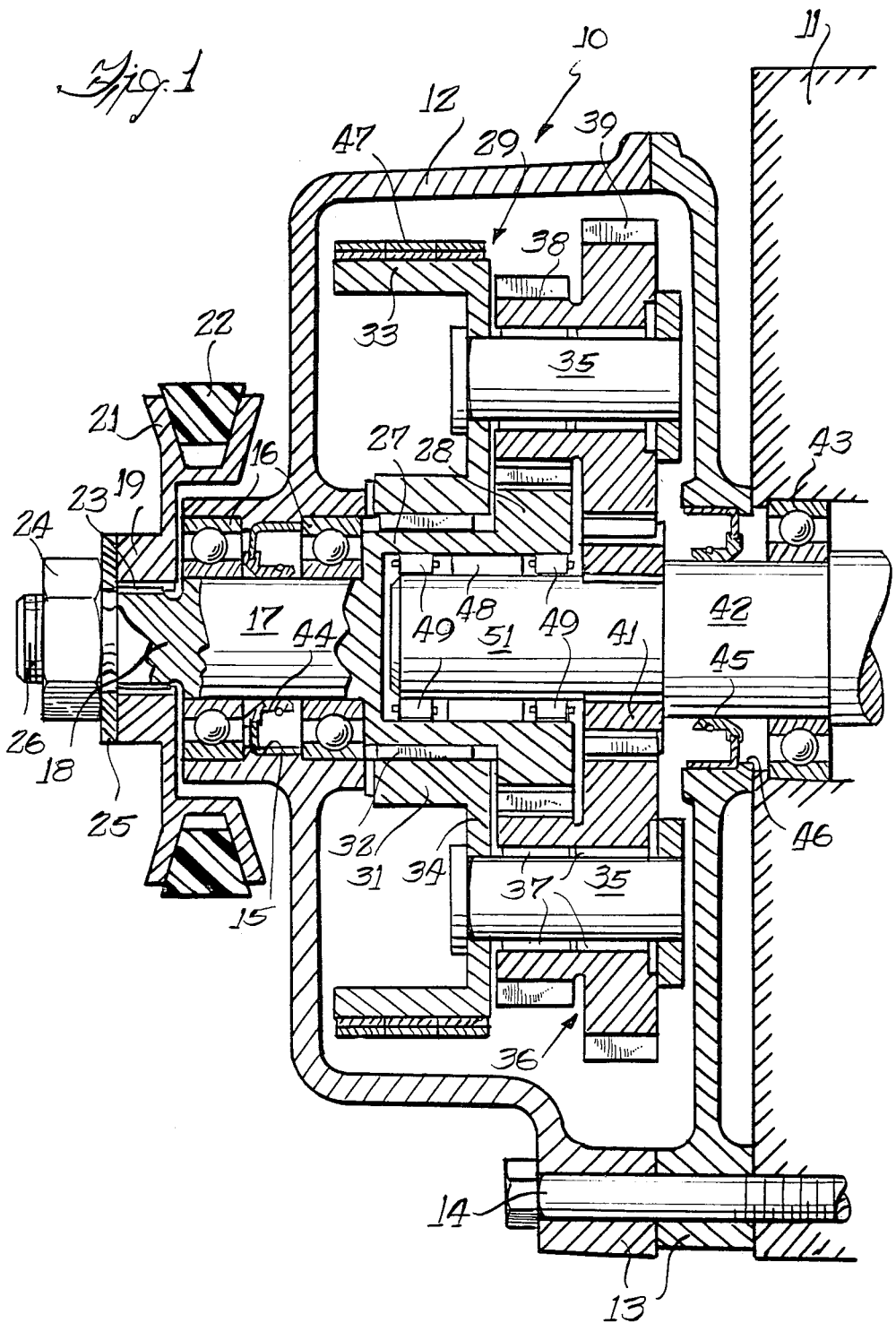
FIG. 1 is a cross-sectional view through a two-speed alternator drive of the present invention mounted on the end of an automobile alternator.

Referring more particularly to the disclosure in the drawings wherein are shown illustrative embodiments of the present invention, FIG. 1 discloses a two-speed gear box 10 that is appropriately mounted onto the end of an accessory 11, such as an alternator for an automotive vehicle engine. This gear box is mounted on the face of an alternator to control the alternator speeds between 3,000 and 15,000 rpm. The gear box consists of a housing 12 which may be suitably formed of two parts to allow ease of assembly and accessability, the two parts having several lugs or ears 13 with aligned passages to receive mounting bolts 14 to secure the housing to the accessory. The forward end of the housing includes a flanged central opening 15 having spaced bearings 16,16 rotatably receiving an input shaft 17; the shaft having a reduced forward end 18 to receive the hub 19 of a drive pulley 21 for a drive belt 22 from the engine crankshaft (not shown). The drive pulley 21 is connected to rotate with the input shaft end 18 through a splined connection 23, and a nut 24 and washer 25 engage the pulley 19 to mount the hub onto the input shaft; the nut engaging the threaded outer end 26 of the input shaft 17.

The inner end of the input shaft 17 terminates in an enlarged sleeve shaft 27 having at its inner end an input sun gear 28. A generally cylindrical planet carrier 29 has a cylindrical hub 31 rotatably mounted on said sleeve shaft 27 through a plurality of needle bearings 32. An outer cylindrical surface 33 is connected to the hub through a radial flange 34, the flange carrying a plurality of carrier shafts 35 for compound planet gears 36; the planet gears being rotatably supported on shafts 35 through needle bearings 37.

The compound gearing includes a plurality of first planet gears 38 intermeshing with the input sun gear 28, and a plurality of second planet gears 39 meshing with a second sun gear 41. The first and second planet gears are integral, however, the first planet gears are of a smaller pitch diameter, and thus a smaller number of teeth, than the second planet gears to provide a desired drive ratio. The second or output sun gear 41 is splined to an output shaft 42 which is rotatably mounted in a bearing 43 to project into and drive the accessory, such as an automobile alternator. Suitable sealing means 44 for the input shaft 17 is mounted in the flanged opening 15 between the bearings 16,16, and suitable sealing means 45 is mounted in a central opening 46 in the housing 12 to sealingly engage the output shaft 42 adjacent the bearing 43.

A brake band 47 encompasses the outer cylindrical surface 33 of the planet carrier 29 and is adapted to engage said surface to alter the drive ratio of the gear box. Also, a one-way clutch 48 is positioned between bearings 49,49 between the sleeve shaft 27 and the inner reduced end 51 of the output shaft 42. Suitable vacuum means (not shown) is utilized to engage or disengage the brake band 47.

When the vehicle engine is at idle speed, the speed of the alternator 11 can be increased by applying vacuum to the actuator which engages the brake band 47 with the planet carrier surface 33 stopping the rotation of the planet carrier. The gear train reacts like a parallel countershaft arrangement with the planet carrier 29 being held by the brake band 47. The input sun gear 28 turns clockwise driving the first set of planet gears 38 counterclockwise. The second set of planet gears 39 are connected to the first set of planet gears 38 and turn in the same direction and at the same speed as the first set of planet gears. The second set of planet gears drive the output sun gear 41 clockwise, the same direction as the input sun gear 28. The speed of the output shaft 42 equals the input shaft speed times the gear ratios of the first and second planet gears.

When a speed increase is no longer necessary, the vacuum is released and a spring (not shown) disengages the brake band 47 from the planet carrier surface 33. The planet carrier 29 turns clockwise, the same direction as the input shaft 17, and the planet gears 38 and 39 no longer transmit torque to the output sun gear 41. The output shaft 42 slows down until its speed equals that of the input shaft 17. The one-way clutch 48 now drives the output shaft 42 clockwise at the same speed as the input shaft 17. The planet carrier 29 and both sets of planet gears 38,39 rotate as a solid unit at the same speed as the input shaft 17, so there is no relative motion between the gears. Obviously, the one-way clutch 48 allows the output shaft 42 to overspeed the input shaft 17 when the brake band 47 engages the cylindrical surface 33 of the planet carrier 29.

The output shaft speed for this device follows the equation $$O_S = I_S \left( \frac{PD_{IS}}{PD_{PG1}} \cdot \frac{PD_{PG2}}{PD_{OS}} \right)$$

where $O_S$ equals the output shaft speed, $I_S$ equals the input shaft speed, $PD_{IS}$ is the pitch diameter of the input sun gear, $PD_{PG1}$ is the pitch diameter of the first set of planet gears, $PD_{PG2}$ is the pitch diameter of the second set of planet gears, and $PD_{OS}$ is the pitch diameter of the output sun gear.

FIGS. 2 through 5 show various alternative arrangements of this basic gear train concept with other possible locations of the one-way clutch and the brake band. As seen, FIG. 2 discloses a schematic showing of the gear train arrangement similar to FIG. 1 except the input shaft 17 projects into a sleeve shaft 27' on the inner end of output shaft 42. Considering FIG. 3, the input shaft 17 drives sun gear 28 in meshing engagement with the first planet gears 38 and the second planet gears 39 are in meshing engagement with the output sun gear 41 on the output shaft 42. However, the planet carrier 29 is positioned on the opposite end of the gear train, and the one-way clutch 48 is located between the inner hub 31 of the planet carrier and the output shaft 42. As in the previous arrangement, the brake band 47 engages the outer cylindrical surface 33 of the planet carrier 29.

In FIG. 4, the gear train arrangement is substantially similar to that shown in FIGS. 1 and 2 except for the fact that the one-way clutch 48 is located between the input shaft 17 and the inner hub 31 of the planet carrier 29; the one-way clutch allowing free rotation of the input shaft 17 while the brake band 47 engages the cylindrical surface 33 of the planet carrier 29. Then, when the brake band is disengaged, the one-way clutch engages between the input shaft and the inner hub of the planet carrier such that the planet carrier and both sets of planet gears rotate as a solid unit at the same speed as the input shaft so there is no relative motion between the gears.

Finally, the arrangement of FIG. 5 shows the planet carrier 29 rotatably mounted on the input shaft 17 and the first and second sets of planetary gears engaging the input sun gear and the output sun gear for the output shaft. However, in this version the one-way clutch 48 is located between the bearings 37 on the carrier shaft 35 of the planet carrier and between the shaft and the integral hub for the first and second set of planetary gears. Thus, the one-way clutch allows the planet gears to overrun the shaft for the planet carrier when the brake band is engaged, and when the brake band is disengaged, the one-way clutch locks up the planet gears with the planet carrier so that they operate as a unit.

The unique feature of the present invention is the use of planetary type of gear arrangement with two sun gears, compound planet gears, but no ring gear. This allows several advantages over the standard planetary gears that use a ring gear:

1. Speed increase ratios near one-to-one are possible with this design but ratios less than or equal to two-to-one are not available if a ring gear was used.

2. Planet speeds are lower in this design than standard planetary gears for equal ratios of input to output speeds.

3. The overall package is smaller without the ring gear.

4. Bearing loads on the planet gears are smaller on this design than a planetary with a ring gear because the reaction loads due to gear loads tend to cancel each other instead of adding together as in planetary sets.

Considering FIGS. 6 and 7, FIG. 6 illustrates a conventional planetary gear arrangement with a sun gear, ring gear and planetary gears. The bearings for the planet gears such as bearings 37 shown in FIG. 1, have a reaction load ($R_{BRG}$) that is equal to the sum of the reaction load on the sun gear ($R_S$) and the reaction load on the ring gear ($R_R$). However, as shown in FIG. 7, the reaction load on the bearings ($R_{BRG}$) is the difference between the reaction load of the second sun gear ($R_{S2}$) and the reaction load of the first sun gear ($R_{S1}$) Thus, in the planetary arrangement of the present invention, the reaction loads of the sun gears tend to cancel each other instead of adding together.

The two-speed alternator drive of the present invention is envisioned as being controlled by the engine control module of the vehicle. However, the final control strategy would have to be tailored to the particular application, and the decision to shift into the engaged mode could be based on one or more of the following conditions:

1. An engine speed less than the determined shift speed.
2. A battery discharge rate greater than the determined maximum allowable rate.
3. A throttle position less than the determined maximum throttle position.
4. A time delay greater than the determined time delay before shift.

The alternator drive could operate in the engaged mode only when necessary by monitoring the engine speed and the battery discharge rate. By monitoring the throttle position, the operation of the device in its engaged mode could be prevented under heavy engine accelerations. This would minimize any alternator drag on the engine at that time, and the time delay would help prevent unnecessary operating mode changes and prevent the device from operating in the engaged mode during engine start up.

Once the device has been engaged, the decision to disengage the device could be based on the following conditions:

1. Engine speed greater than the predetermined shift speed.
2. Throttle position greater than the determined maximum position.
3. If the engine has been shut off resulting in a loss of vacuum.

The device could be signaled to a disengaged mode by any of the above conditions to prevent the alternator from being run at excessive speeds.

Figure 8:
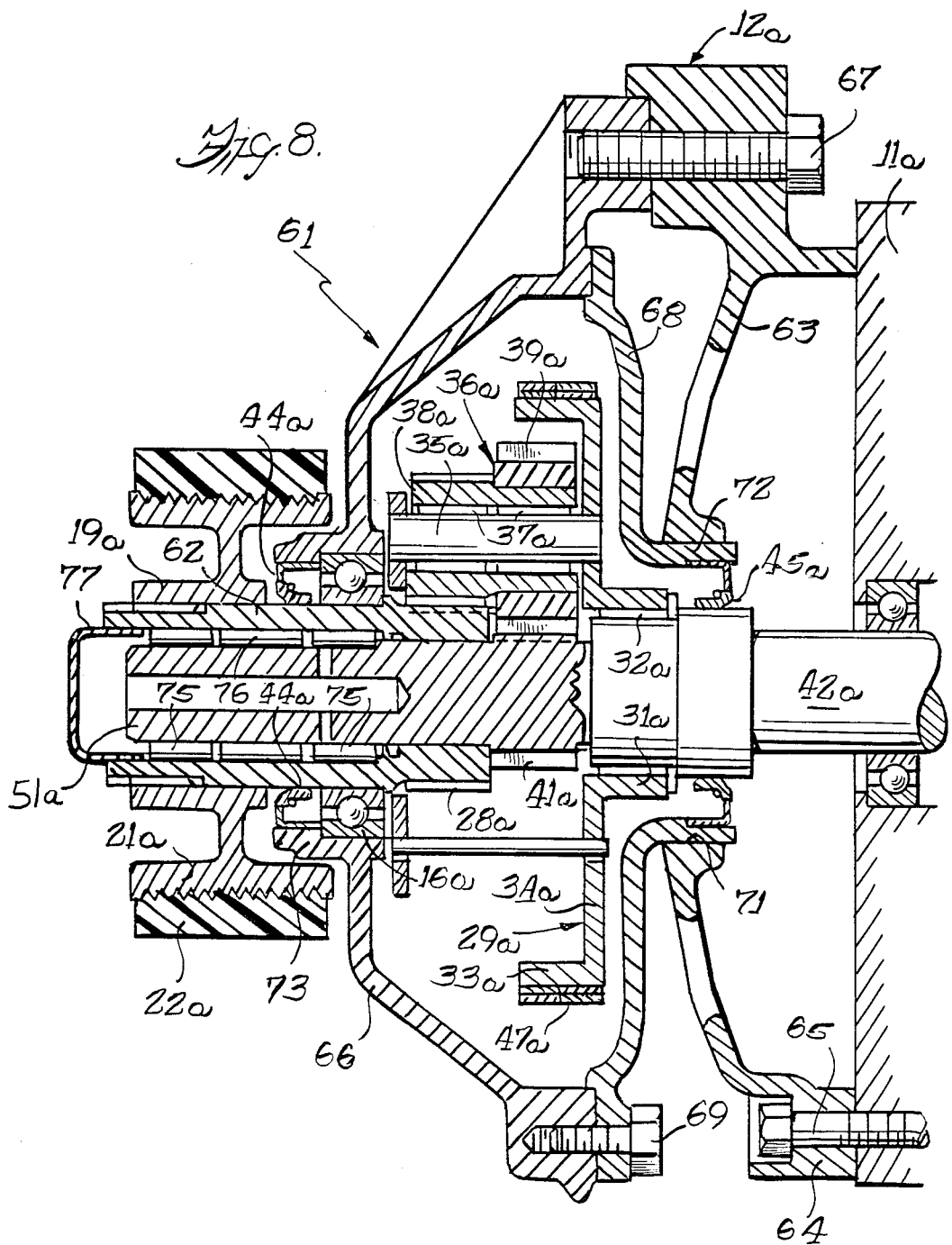
FIG. 8 is a cross-sectional view of an alternate arrangement of the two-speed drive of the present invention.

FIG. 8 discloses an alternative embodiment of two-gear drive 61 wherein like parts have the same numeral with the addition of a script a. In this version, the accessory drive shaft 42a extends from its housing 11a substantially completely through the gear housing 12a to a point short of the end of sleeve shaft 62. The housing 12a consists of a rear member 63 having fastening lugs 64 to receive bolts 65 securing the member to the accessory drive 11a, a front housing member 66 secured to the rear member by bolts 67 and an intermediate member 68 secured to the front member by bolts 69. The rear member 63 has a central opening 71 receiving the inner axial flange 72 of the intermediate member 68, the flange carrying sealing means 45a for the shaft 42a.

Also, the front housing member 66 has a central opening defined by axial flange 73 carrying sealing means 44a and a bearing 16a for the sleeve shaft 62.

A pulley 21a for the drive belt 22a to the engine crankshaft (not shown) has a hub 19a secured to the sleeve shaft by suitable means, such as a key and keyway. Between the sleeve shaft 62 and the reduced outer end 51a of shaft 42a are two sets of needle bearings 75,75 axially separated by a one-way clutch 76. A cap 77 closes the open end of sleeve shaft 62 to retain lubricant in the bearings. The inner end of the sleeve shaft terminates in a first sun gear 28a while a second sun gear 41a is secured for rotation with shaft 42a. A planet carrier 29a includes a cylindrical hub 31a rotatably mounted on the shaft 42a by needle bearings 32a and a cylindrical outer flange or surface 33a connected to the hub by a radial flange 34a carrying a plurality of shafts 35a for compound planet gears 36a rotatably mounted on the shafts by needle bearings 37a.

Each compound planet gear 36a includes a first planet gear 38a meshing with sun gear 28a and an integral second planet gear 39a meshing with sun gear 41a; the first planet gear having a smaller pitch diameter relative to the second planet gear. Also, a brake band 47a encompasses the outer surface 33a and is suitably actuated to engage and halt rotation of the carrier. This embodiment operates in substantially the same manner as the embodiment of FIG. 1; the one-way clutch 76 being so oriented as to allow the shaft 42a to overrun the sleeve shaft 62.

I claim:

1. A two-speed gear box adapted to be mounted on the face of an accessory to be driven, comprising an input shaft operatively connected to a vehicle engine, an output shaft driving the accessory, a planetary gear train operatively connecting the input and output shafts and including a pair of sun gears and pairs of planet gears engaging the sun gears, and a planet carrier having a plurality of shafts carrying said pairs of planet gears, said pairs of planet gears being integral and rotatable on said carrier shafts, said planet carrier having an inner hub and an outer cylindrical surface cooperating with means to retain said planet carrier against rotation, and a one-way clutch operatively connecting said input and output shafts to releasably lock said shafts for simultaneous rotation.

2. A two-speed gear box as set forth in claim 1, wherein said pairs of planet gears have different pitch diameters, the smaller pitch diameter gears engaging a first sun gear and the larger pitch diameter gears engaging the second sun gear.

3. A two-speed gear box as set forth in claim 2, wherein said first sun gear is mounted for rotation with said input shaft and said second sun gear is mounted for rotation with said output shaft.

4. A two-speed gear box as set forth in claim 1, wherein said retaining means is a brake band releasably engaging said cylindrical surface, and means to actuate said brake band.

5. A two-speed gear box as set forth in claim 1, wherein said input shaft terminates in a sleeve shaft portion rotatably receiving an inner end of said output shaft therein, and said one-way clutch is positioned between said sleeve shaft portion and output shaft.

6. A two-speed gear box as set forth in claim 1, wherein said output shaft terminates at its inner end in a sleeve shaft portion rotatably receiving the inner end of the input shaft, and said one-way clutch is positioned between said input and sleeve shafts.

7. A two-speed gear box adapted to be mounted on the face of an accessory to be driven, comprising an input shaft operatively connected to a vehicle engine, an output shaft driving the accessory, a planetary gear train operatively connecting the input and output shafts and including a pair of sun gears and pairs of integral planet gears engaging the sun gears, and a planet carrier having a plurality of shafts carrying said pairs of planet gears for rotation thereon, said planet carrier having an inner hub and an outer cylindrical surface cooperating with means to retain said planet carrier against rotation, said planet carrier hub encompassing said output shaft, and a one-way clutch located between said output shaft and carrier hub to releasably lock said input and output shafts for simultaneous rotation.

8. A two-speed gear box adapted to be mounted on the face of an accessory to be driven, comprising an input shaft operatively connected to a vehicle engine, an output shaft driving the accessory, a planetary gear train operatively connecting the input and output shafts and including a pair of sun gears and pairs of integral planet gears engaging the sun gears, and a planet carrier having a plurality of shafts carrying said pairs of planet gears for rotation thereon, said planet carrier having an inner hub and an outer cylindrical surface cooperating with means to retain said planet carrier against rotation, said planet carrier hub encompassing said input shaft, and a one-way clutch positioned between said hub and input shaft to releasably lock said input and output shafts for simultaneous rotation.

9. A two-speed gear box adapted to be mounted on the face of an accessory to be driven, comprising an input shaft operatively connected to a vehicle engine, an output shaft driving the accessory, a planetary gear train operatively connecting the input and output shafts and including a pair of sun gears and pairs of integral planet gears engaging the sun gears, said pairs of planet gears having different pitch diameters, the smaller pitch diameter gears engaging a first sun gear mounted for rotation with said input shaft and the larger pitch diameter gears engaging the second sun gear mounted for rotation with said output shaft, and a planet carrier having a plurality of shafts carrying said pairs of planet gears for rotation thereon, said planet carrier having an inner hub and an outer cylindrical surface cooperating with means to retain said planet carrier against rotation, said pairs of planet gears each having a central passage receiving the carrier shaft, and a one-way clutch positioned between each carrier shaft and pair of planet gears to releasably lock said input and output shafts for simultaneous rotation.

10. A two-speed gear box adapted to be mounted on the face of an accessory to be driven, comprising an input shaft operatively connected to a vehicle engine, an output shaft driving the accessory, a planetary gear train operatively connecting the input and output shafts and including a pair of sun gears and pairs of integral planet gears engaging the sun gears, and a planet carrier having a plurality of shafts carrying said pairs of planet gears for rotation thereon, said planet carrier having an inner hub and an outer cylindrical surface cooperating with means to retain said planet carrier against rotation, said input shaft being a sleeve shaft encompassing said output shaft, bearings located between said shafts, and a one-way clutch between said shafts to releasably lock said input and output shafts for simultaneous rotation.

11. A two-speed gear box as set forth in claim 10, wherein said output shaft extends substantially completely through said gear box and sleeve shaft; said planet carrier being rotatably mounted on said output shaft.

12. A two-speed gear box adapted to be mounted on the face of a vehicle accessory to be driven, comprising an input shaft driven from a vehicle engine crankshaft, an output shaft driving the accessory, a planetary gear train between said shafts including a first sun gear mounted on said input shaft, a second sun gear mounted on said output shaft, a planet carrier rotatably mounted on said input shaft and having a cylindrical outer surface, and pairs of first and second planet gears rotatably carried by said carrier and meshing with the respective sun gears, said pairs of gears being integral to rotate together, means engaging the planet carrier surface to retain the carrier against rotation, and a one-way clutch releasably connecting said input and output shafts together to rotate simultaneously.

13. A two-speed gear box as set forth in claim 12, wherein the pitch diameter of said first sun gear is larger than that of said second sun gear, and the pitch diameter of said second planet gear is larger than said first planet gear.

14. A two-speed gear box as set forth in claim 12, in which said engaging means is a brake band releasably engaging said planet carrier surface.

* * * * *

UNITED STATES PATENT AND TRADEMARK OFFICE
CERTIFICATE OF CORRECTION

PATENT NO. : 4,862,770
DATED : September 05, 1989
INVENTOR(S) : Franklin R. Smith It is certified that error appears in the above-identified patent and that said Letters Patent is hereby corrected as shown below: ON TITLE PAGE:

In the "Inventor: " details:

"Slaterville Springs, N.J." should be --Slaterville Springs, N.Y.--

Signed and Sealed this

Tenth Day of March, 1992

Attest:

HARRY F. MANBECK, JR.

*Attesting Officer*     *Commissioner of Patents and Trademarks*